(12) United States Patent
Hamblin

(10) Patent No.: US 6,458,025 B1
(45) Date of Patent: Oct. 1, 2002

(54) REMOVABLE SKINNING BLADE ASSEMBLY FOR MEAT SKINNING MACHINE

(75) Inventor: David Hamblin, Norwalk, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/855,928

(22) Filed: May 15, 2001

(51) Int. Cl.⁷ ............................................... A22C 17/12
(52) U.S. Cl. ........................... 452/127; 99/565; 452/125
(58) Field of Search .................................. 452/126, 127, 452/135, 125; 99/588, 584, 595

(56) References Cited

U.S. PATENT DOCUMENTS

| | | | |
|---|---|---|---|
| 3,513,893 A | 5/1970 | Townsend | |
| 4,466,344 A | 8/1984 | Schill | |
| 4,606,093 A | * 8/1986 | Townsend | 452/127 |
| 4,730,376 A | 3/1988 | Yamada | |
| 5,083,973 A | 1/1992 | Townsend | |
| 5,211,097 A | 5/1993 | Grasselli | |
| 5,336,125 A | * 8/1994 | Despointes | 452/127 |
| 5,350,334 A | 9/1994 | Holms | |
| 5,660,218 A | 8/1997 | Jonkka | |
| 5,738,156 A | 4/1998 | Stewart | |
| 6,030,326 A | 2/2000 | Azuma et al. | |
| 6,299,523 B1 | * 10/2001 | Wonderlich et al. | 452/127 |

FOREIGN PATENT DOCUMENTS

IT 0437873 A1 * 7/1991 ........... A22C/17/12

OTHER PUBLICATIONS

U.S. patent application Ser. No. 09/777,759, Wonderlich, et al., filed Feb. 2, 2001.

* cited by examiner

Primary Examiner—Thomas Price
Assistant Examiner—Floris C Copier

(57) ABSTRACT

A skinning blade assembly with a blade, clamp, and shoe where the blade is frictionally received in a recess formed in the bottom surface of the clamp, the clamp having a slot that extends from the top of the clamp through the bottom of the clamp such that a tool can be inserted in the slot to apply sufficient force against the back edge of the blade to overcome the frictional force of the clamp acting on the blade to remove the blade from the receiving recess.

1 Claim, 3 Drawing Sheets

REMOVABLE SKINNING BLADE ASSEMBLY FOR MEAT SKINNING MACHINE

BACKGROUND OF THE INVENTION

The present invention is directed to a skinning blade assembly and more particularly to a removable skinning blade assembly for meat skinning machines.

Skinning blade assemblies are well known in the art and generally comprise an elongated skinning blade with a clamp to hold the blade in place which is mounted on a shoe. With use, the cutting edge of the blade can become worn, dull, or clogged requiring removal and/or cleaning of the blade one or more times each day. Presently, removal of the blade requires a technician to disassemble the skinning assembly by loosening or removing the clamp from the shoe which permits disengagement of the blade from underneath the clamp. The process is time consuming requiring not only excessive manpower, but also shut down time of the skinning machine resulting in lost productivity.

Therefore, a principal objective of the present invention is to provide a skinning blade assembly where the blade can easily be removed and replaced.

BRIEF SUMMARY OF THE INVENTION

The skinning blade assembly has an elongated blade, a clamp which receives the blade, and a shoe upon which the clamp is mounted. The clamp has a top, two sides, two ends, and a bottom. The bottom of the clamp has an elongated recess that receives the blade. The clamp also has one or more narrow slots that extend from the top of the clamp through the bottom of the clamp and intersect the rearward edge of the recess.

The blade has a cutting edge, a back edge, and two side edges. When the blade is placed in the recess of the clamp its rearward edge engages the rearward edge of the recess. The force of on-coming meat products hold the blade in that position. The slot or slots extend downwardly through the clamp and expose a short portion of the rearward edge of the blade. The rearward ends of the slots terminate rearwardly of the rearward edges of the recess and the blade. To remove the blade a screwdriver or similar tool is inserted in the clamping slot and sufficient force is applied to the back edge of the blade to push the blade out of the recess.

DETAILED DESCRIPTION OF THE INVENTION

Figure 1:
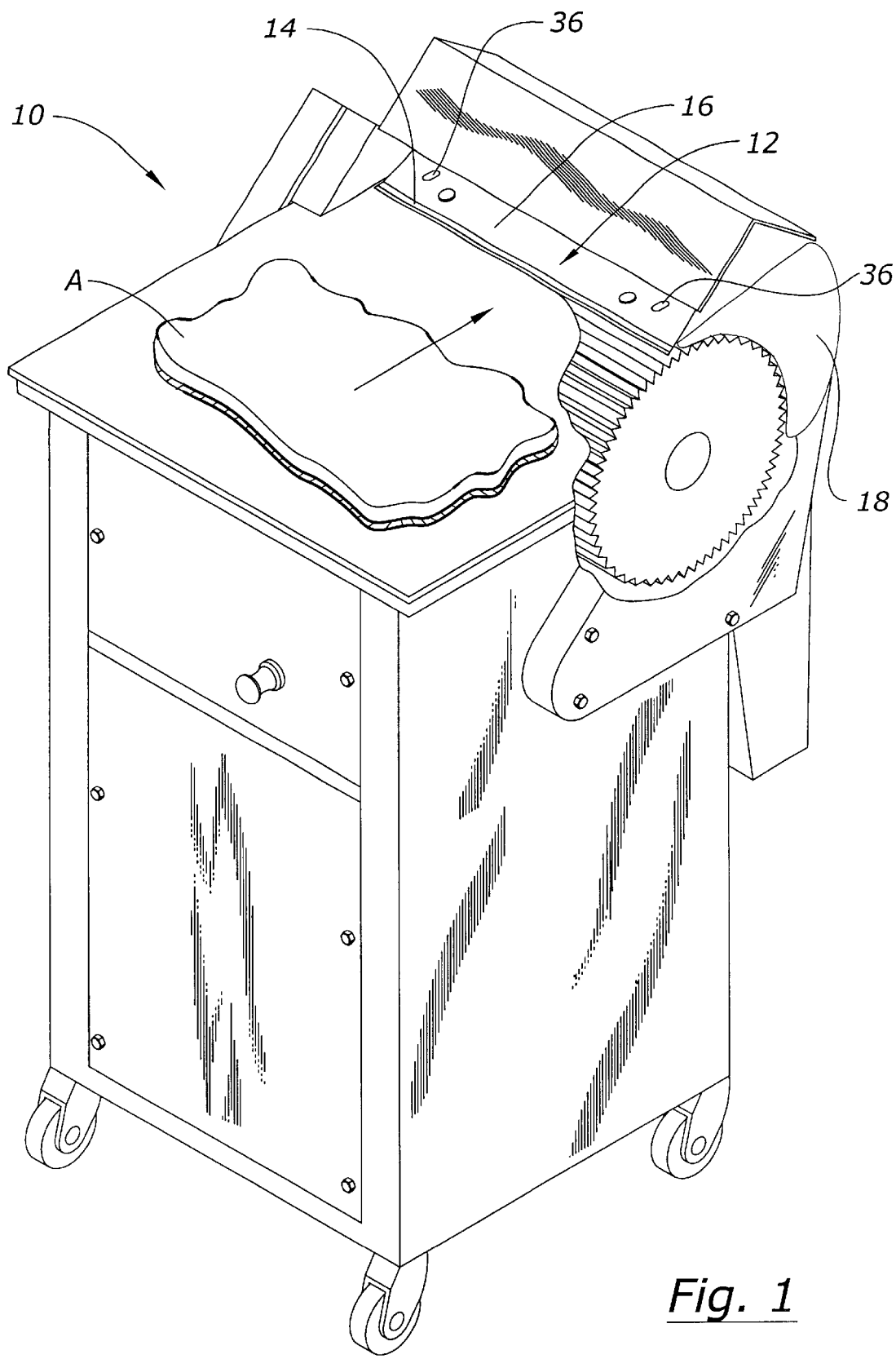
FIG. 1 is a perspective view of a skinning machine with the skinning assembly of this invention.

With reference to the Figures, the numeral 10 generally refers to a skinning machine and the numeral 12 designates the skinning blade assembly of this invention which includes an elongated skinning blade 14, a clamp 16, and a shoe 18. (FIG. 3)

The skinning blade 14 has a cutting edge 20, a back edge 22, and two side edges 24. (FIG. 2) The clamp 16, which is mounted to the shoe 18, has a top 26, (FIG. 3) two sides 28, two ends 30, (FIG. 2) and a bottom 32. Formed on the bottom 32 of the clamp 16 is a recess 34 (FIG. 3) for receiving and holding the blade 14. The recess 34 has a back edge 35 which is coextensive with the back edge 22 of blade 14 when the blade is in the assembled position of FIGS. 2 and 3. Force applied by a meat product A (FIG. 1) upon the blade 14 when the blade is in the receiving recess 34 is sufficient to hold the blade 14 in place during operation of the skinning machine when meat products, which include meats, chicken, and fish, come into contact with the blade 14.

Figure 2:
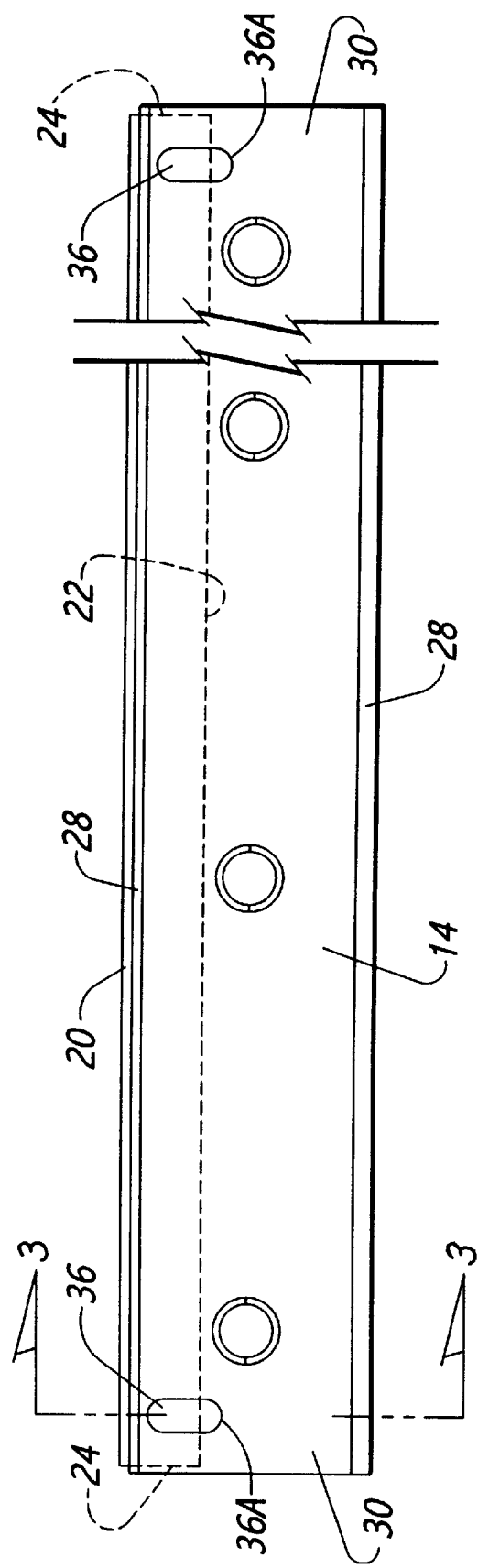
FIG. 2 is a top plan view of the skinning blade assembly of this invention.
Figure 3:
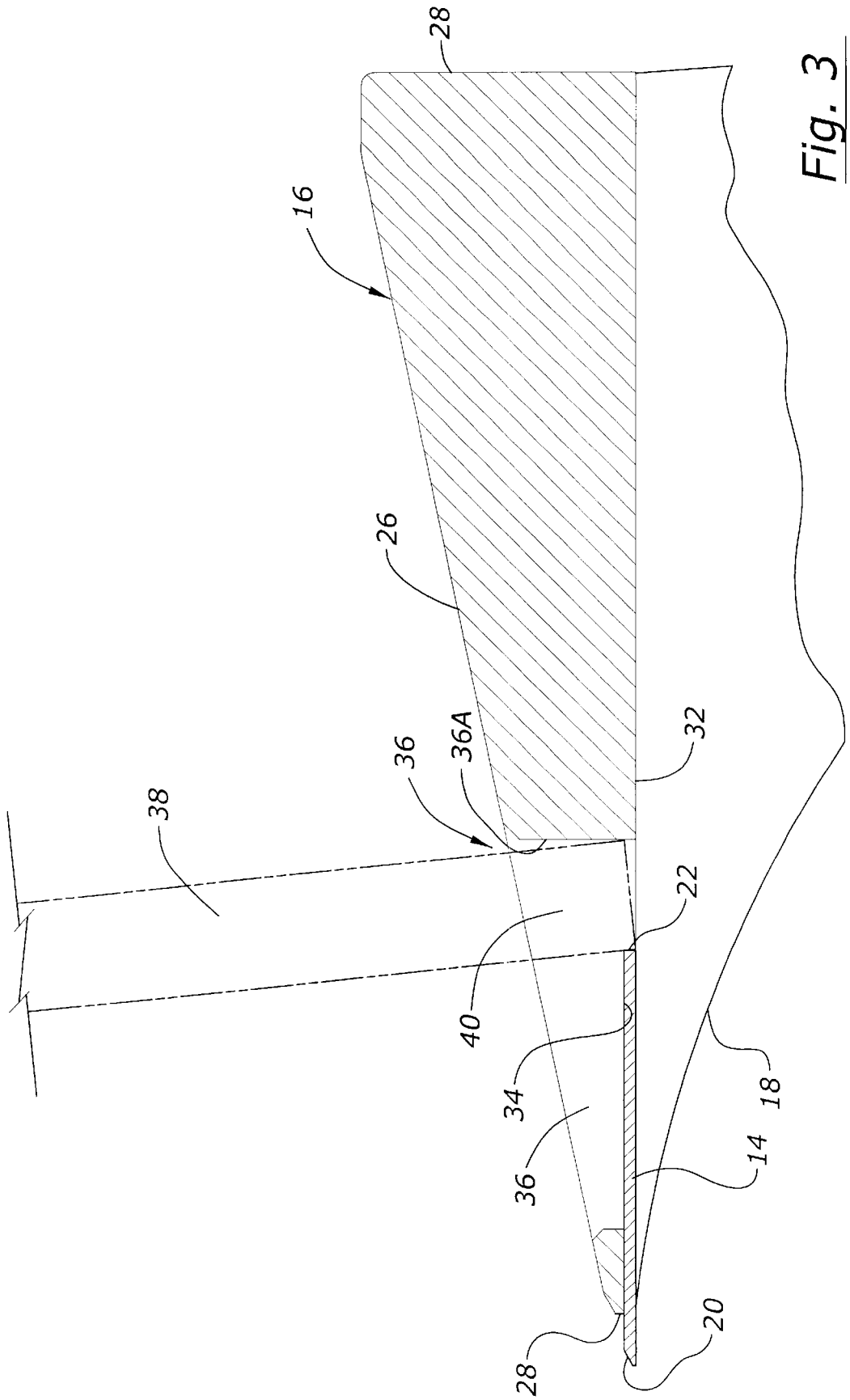
FIG. 3 is an enlarged scale sectional view of the skinning blade assembly of this invention taken on line 2—2 of the FIG. 2.

The clamp 16 also has a slot 36 that extends from the top 26 of the clamp 16, through the clamp to the bottom 32, and has a back end 36A (FIG. 3). Preferred are a plurality of slots 36 that are positioned near the ends 30 of the clamp. (FIG. 2) The slots 36 are also positioned such that when the blade 14 is fully inserted within the receiving recess 34, the back edge 22 of the blade 14 is in communication with slot 36 and in engagement with the rear edge of recess. In other words, when looking through slot 36 from the top 26 of the clamp 16 the back edge 22 of the blade 14 can be seen as shown in FIG. 2.

To remove the blade 14, a screwdriver 38 or similar tool is inserted in slot 36 such that the end 40 of the tool 38 fits behind the back edge 22 of the blade 14. (FIG. 3) By applying sufficient force provided by the tool 38 acting against the back edge 22 of the blade 14, and using the end 36A as a fulcrum, the blade 14 can be pushed out of the recess 34 for replacement, sharpening, and or cleaning. To reinsert the blade 14 into the recess 34, the blade is manually inserted within the recess 34.

As can be seen by this description, the skinning blade assembly does not need to be taken apart in order to remove and replace the blade. Therefore, this invention will accomplish at least its stated objective as well as those contemplated by those of ordinary skill in the art. While this description has outlined a preferred embodiment of the invention, various alterations, modifications, and/or additions may be introduced into constructions and arrangement of parts described above without departing from the spirit or ambit of the present invention as defined by the appended claims.

What is claimed is:

1. A skinning blade assembly comprising:

a clamp with top, two sides, two ends, and a bottom;

an elongated blade with a cutting forward edge, a back edge, and two ends;

a freely open tool insertion slot that extends from the top of the clamp to the bottom of the clamp; and a horizontal blade receiving recess being formed in the bottom of the clamp adjacent a forward edge thereof for receiving the blade such that the back edge of the blade is in only partial communication with the tool insertion slot, so that an elongated tool can be inserted into the tool insertion slot so that a lower end of the tool can engage a rear edge of the blade while an upper portion of the tool can engage a rearward edge of the tool insertion slot so that the tool can be moved to exert leverage against the back edge of the blade to slide the blade forwardly out of the blade receiving recess.

* * * * *